(12) United States Patent
Tokizawa et al.

(10) Patent No.: US 6,308,549 B1
(45) Date of Patent: Oct. 30, 2001

(54) APPARATUS AND METHOD FOR FORMING SPIRALLY WOUND STATOR CORE OR ROTARY ELECTRIC MACHINE

(75) Inventors: Takashi Tokizawa, Nisshin; Katsumi Nagasaka, Obu; Masahiro Asano, Anjo; Toshihiko Fujimoto, Tokai; Katsumi Matsumoto, Okazaki; Katsuyoshi Shiraishi, Chiryu; Kazutaka Maeda, Toyota; Satoru Nejigane, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/440,511

(22) Filed: Nov. 15, 1999

(30) Foreign Application Priority Data

| Nov. 26, 1998 | (JP) | 10-336156 |
| Aug. 6, 1999 | (JP) | 11-223588 |
| Aug. 6, 1999 | (JP) | 11-224501 |

(51) Int. Cl.[7] ........................ B21D 11/06

(52) U.S. Cl. ............................... 72/136; 72/142

(58) Field of Search .................. 72/135, 136, 379.2, 72/379.4, 252.5, 142, 167

(56) References Cited

U.S. PATENT DOCUMENTS

| 2,437,500 | * | 3/1948 | Bruegger | 72/136 |
| 2,812,794 | * | 11/1957 | Chapman | 72/379.2 |
| 2,815,790 | * | 12/1957 | Mayrath | 72/136 |
| 2,845,555 |   | 7/1958 | Carpenter et al. . | |
| 4,116,033 |   | 9/1978 | Iwaki et al. . | |
| 4,445,353 |   | 5/1984 | Taleff et al. . | |

FOREIGN PATENT DOCUMENTS

| 38-7402 | 8/1960 | (JP) . |
| 62-173955 | 7/1987 | (JP) . |
| 1-164247 | 6/1989 | (JP) . |
| 1-210126 | 8/1989 | (JP) . |

* cited by examiner

*Primary Examiner*—Lowell A. Larson
(74) *Attorney, Agent, or Firm*—Pillsbury Winthrop LLP

(57) ABSTRACT

An apparatus for forming a spirally wound stator core includes a pair of forming rollers having a wedge-shaped gap therebetween, a winding drum, a drum-drive motor, and a roller presser. A strip of magnetic material is inserted into the wedge-shaped gap to be pressed at a controlled pressure so that the strip is bent into a spiral with one side of the strip being radially inside. The controlled pressure is changed automatically according to a memorized relationship between the rotation speeds of the pair of forming rollers and suitable pressures applied to the strip.

9 Claims, 7 Drawing Sheets

APPARATUS AND METHOD FOR FORMING SPIRALLY WOUND STATOR CORE OR ROTARY ELECTRIC MACHINE

CROSS REFERENCE TO RELATED APPLICATION

The present application is based on and claims priority from Japanese Patent Applications: Hei 10-336156 filed Nov. 26, 1998, Hei 11-223588 filed Aug. 6, 1999, and Hei 11-224501 filed Aug. 6, 1999, the contents of which are incorporated herein by reference.

BACKGROUND OF THE INVENTION

1. Field of the Invention

The present invention relates to an apparatus and a method of manufacturing a stator core of a vehicle ac generator and, particularly, a spirally wound stator core of a magnetic steel strip.

2. Description of the Related Art

JP-A-1-164247 disclosed a pair of forming rollers for pressing a magnetic strip in an inclining, thereby thinning the magnetic strips toward one side thereof, thereby forming a spirally piled core.

JP-B2-38-7402 discloses an apparatus for manufacturing a stator core comprising a pair of tapering rollers providing a wedge-shaped space therebetween. A magnetic steel strip is inserted in the space to press-form a spirally piled core.

Because the magnetic steel strip is moved by means of a friction force of the steel strip with the forming roller in any one of the above disclosed apparatuses, it is difficult to prevent the steel strip from slipping on the forming rollers. This occasionally varies thickness of the steel strip and, therefore, the radius of the spiral.

U.S. Pat. No. 4,116,033 or its corresponding Japanese Patent JP-B2-59-36503 discloses an apparatus having a rotatable disk with a plurality of pins fixed thereto, which engage with slots of a magnetic strip to form the strip into a spirally piled core.

Because the number of pins are fixed according to the number of the core slots, it is necessary to change the rotatable disk if a stator core has different number of the core slots.

SUMMARY OF THE INVENTION

A main object of the invention is to provide an improved apparatus and a method for manufacturing spirally wound cores, in which a magnetic steel strip is smoothly moved.

Another object of the invention is to provide an improved apparatus and a method for manufacturing high-precision stator cores.

According to a preferred embodiment of the invention, an apparatus for forming a spirally wound stator core from a strip of magnetic material includes a pair of rollers for pressing one side of the strip to gradually reduce the thickness and a stopper for restricting a distance between the rollers. Preferably, one of the rollers is provided with a sprocket which engages a part of inner cuts of the strip. A guide for restriction movement of the strip in the thickness direction can be also effective to wind the strip.

According to another embodiment of the invention, an apparatus for forming a spirally wound stator core includes a pair of forming rollers having a wedge-shaped gap therebetween, a roller-drive motor connected to one of the forming rollers for continuously inserting a strip of magnetic material into the wedge-shaped gap to bend the strip into a spiral with one side of the strip being radially inside, a winding drum, a drum-drive motor, and a roller presser. A control unit can be provided so that the controlled pressure is changed automatically according to a memorized relationship between the running speed of the strip or the rotation speed of the pair of forming rollers and the pressure applied to the strip.

According to another aspect of the invention, a method for forming a stator core from a strip of magnetic material includes the following steps: a step of pressing the strip at one side thereof to gradually reduce thickness, a step of engaging a sprocket with a part of inner cuts of the strip to move the strip, and a step of winding the strip spirally.

According to another aspect of the invention, a method for forming a spirally wound stator core includes the following steps: continuously inserting a strip of magnetic material into a wedge-shaped gap formed between a pair of forming rollers, pressing one of the forming rollers to reduce the wedge-shaped gap at a controlled pressure, thereby bending the strip into a spiral with one side of the strip being radially inside, positioning a strip-winding drum close to the one side with its axis being perpendicular to the pair of forming rollers, and rotating the strip-winding drum to wind the strip that is bent into a spiral. The controlled pressure is changed according to the running speed of the strip. It can be represented by the rotation speed of one of the pair of forming rollers and the strip-winding drum.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
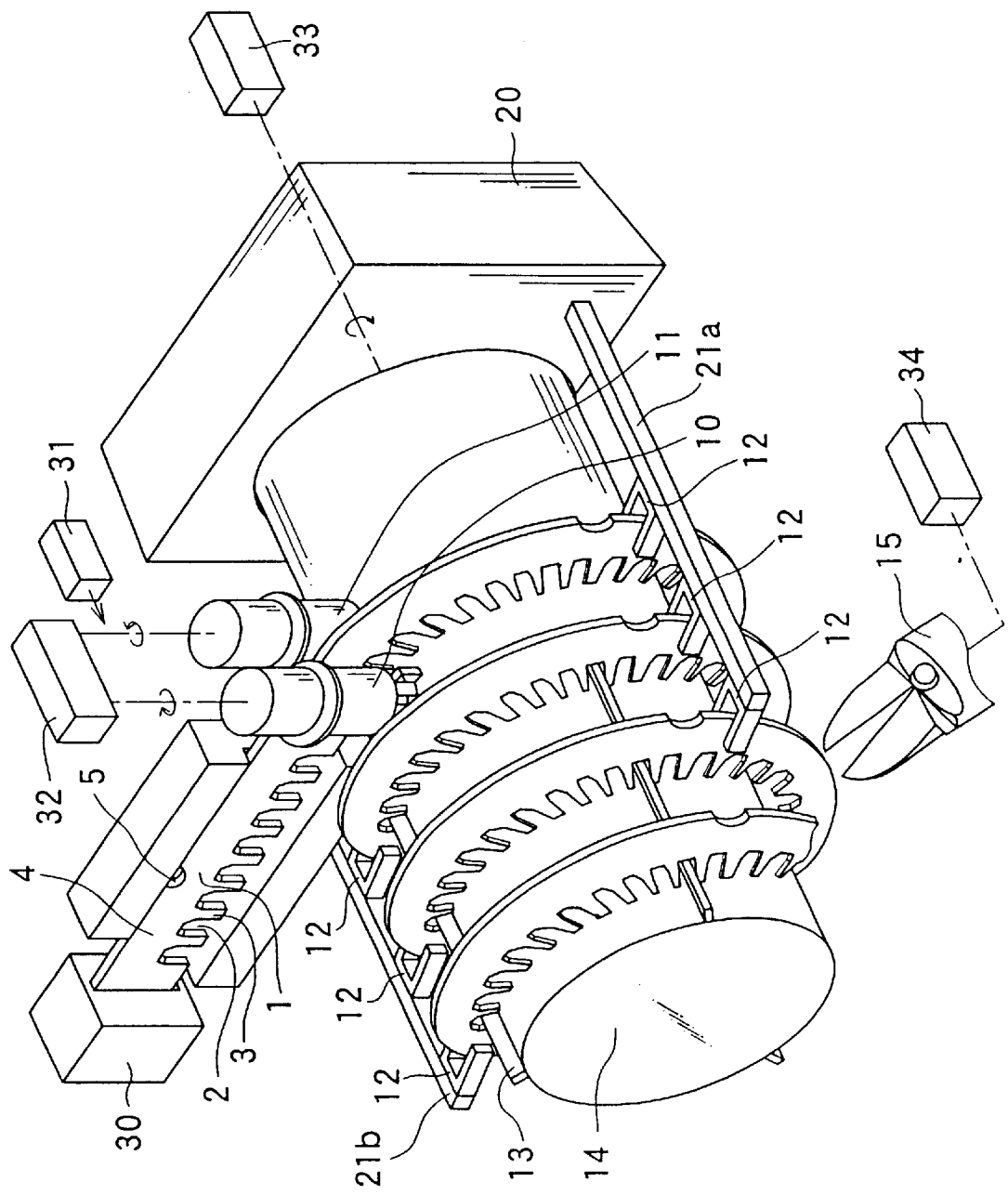
FIG. 1 is a schematic perspective view of a core-forming apparatus according to a first embodiment of the invention.

An apparatus and a method for manufacturing a spirally wound stator core according to a first embodiment of the invention is described with reference to FIGS. 1–4.

Magnetic steel strip 1 is formed to have a plurality of inner cuts 2 forming thirty six slots of a stator core, teeth 3, core-back portion 4 and a plurality of outer cuts 5 forming four grooves for stator fastening bolts by punching-and-loading unit 30. Each outer cut 5 is a shallower semicircular cavity than inner cuts 2. In other words, each outer cut 5 is formed every nine teeth 3.

The apparatus includes a pair of forming rollers 10 and 11, pressure control cylinder 31, side-restriction guide 12, positioning guide 13, winding drum 14 and cutter 25.

The pair of forming rollers 10 and 11 applies a pressure in the direction to narrow the distance between one forming roller 10 and the other forming roller 11. Each of forming rollers 10 and 11 is cylindrical and has tapering surface 10b, 11b on its one end. Sprocket 10a projects from the edge of tapering surface 10b to be engaged with some of inner cuts 2.

Figure 2:
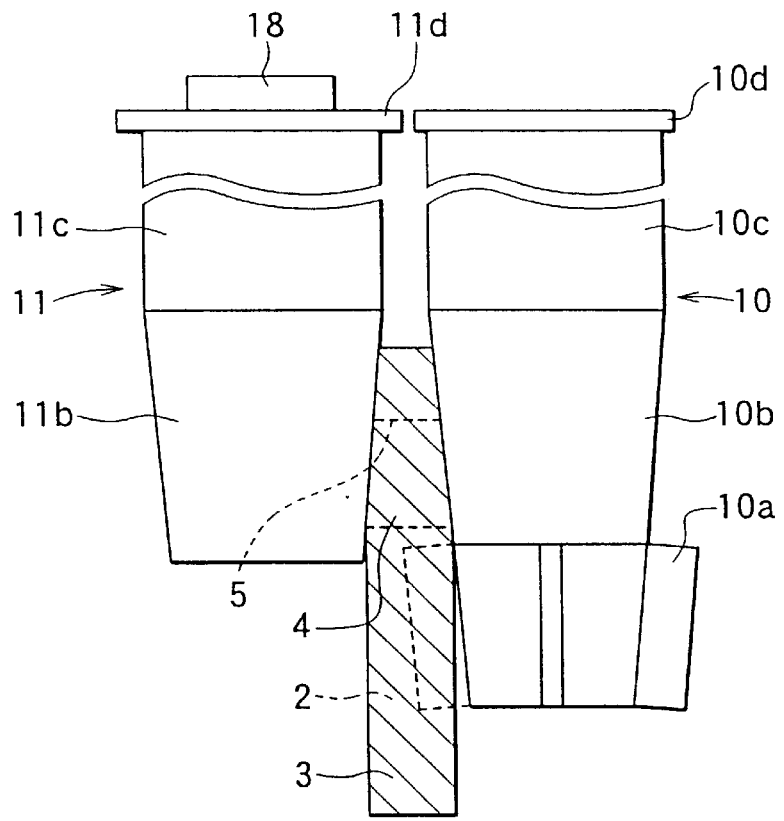
FIG. 2 is a schematic diagram illustrating a step of pressing a magnetic strip by a pair of forming rollers.
Figure 3:
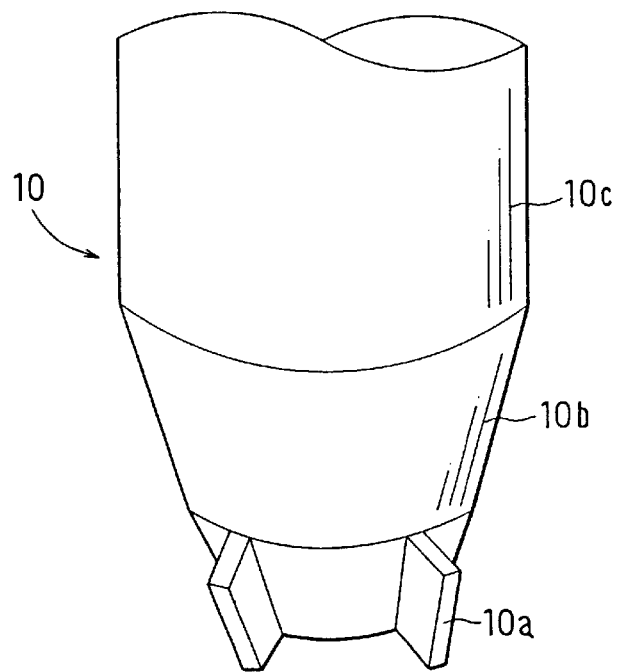
FIG. 3 is a perspective view of one of the roller having a sprocket.
Figure 4:
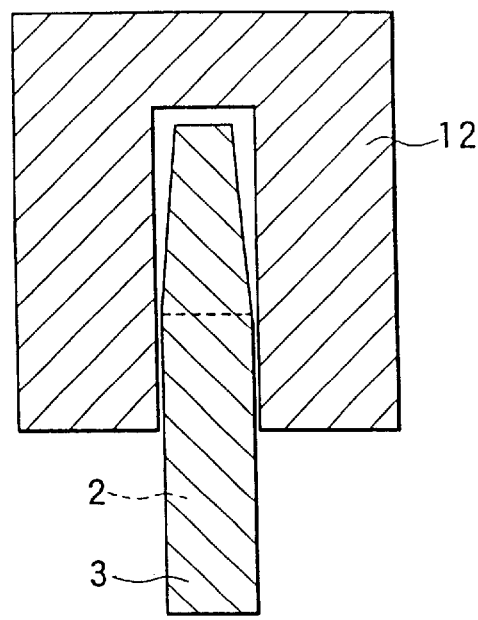
FIG. 4 is a schematic cross-sectional view of a guide and the strip disposed therein.

Air cylinder 18 presses forming roller 11 against core back portion of strip 1, so that tapering surfaces 10b and 11b press core back portion 4 therebetween. Forming rollers 10 and 11 respectively have cylindrical surfaces 10c and 11c and flanges 10d and 11d. Flanges 10d and 11d restrict forming rollers 10 and 11 to become too close to each other. As shown in FIG. 2, flanges 10d and 11d provide a minimum distance between forming rollers 10 and 11 to prevent core back portion 4 around each of outer cuts 5 from becoming too thin. This also prevents side-restriction guide 12 from being entrapped into outer cuts 5.

The distance between tapering surface 10b and tapering surface 11b widens as it approaches to the edges of forming rollers 10 and 11. When the pair of forming rollers 10 and 11 is rotated by drive unit 32, core back portion 4 is formed thinner as it approaches the edge opposite inner cuts 2. Formed portions of magnetic steel strip 1 are continuously sent out from the pair of forming rollers 10 and 11 by rotation.

Sprocket 10a projects from an edge of tapering surface 10b to be engaged with a part of inner cuts 2. When the pair of forming rollers 10 and 11 rotates, sprocket 10a pushes side walls of teeth 3, thereby assisting the pair of forming rollers 10 and 11 to send out a formed portion of strip 1.

Since the side of core back portion 4 of the formed portion opposite teeth 3 is thinned and extended in the longitudinal direction, the formed portions of strip 1 bends into a spiral.

The spirally bent portions of strip 1 are wound around winding drum 14, which is supported by support block 20 to be rotated by drive unit 33 in synchronism with the pair of forming rollers 10 and 11. In other words, the sending speed of the pair of forming rollers 10 and 11 is equal to the winding speed of winding drum 14. Winding drum 14 has a cylindrical shape of an outside diameter that corresponds to the inside diameter of the spirally wound stator core to be manufactured.

Winding drum 14 has axially extending positioning guide 13 which projects radially outward from a peripheral portion of drum 13 to engage one of inner cuts 2 and rotates with winding drum 14 when the formed portions of strip 1 is wound. Thus, positioning guide 13 also assists the pair of forming rollers 10 and 11 to send out or carry the formed portions of strip 1 and aligns inner cuts 2 in the axial direction to form the thirty six slots of the spirally wound stator core.

A pair of side restriction guides 12 is disposed in a mirror image manner at opposite portions around winding drum 14 to which the formed portions of strip are sent. Each restriction guide 12 is fixed to one of a pair of rod members 21a and 21b, which is fixed to support block 20. Each restriction guide 12 has a plurality of forked teeth extending at equal intervals toward core back portions 4 to hold the same therebetween. Restriction guides 12 only restrict the movement of the side surfaces to maintain the formed portions of strip 1 to be perpendicular to winding drum 14. The plurality of forked teeth of rod member 21a are a certain pitch offset in the axial direction from the plurality of forked teeth of rod member 21b to hold the spirally formed portions of strip 1 like a female screw thread. Thus, the spirally formed portions of strip 1 are continuously wound around winding drum 14.

When a prescribed number of layers of the spirally formed portions are wound by winding drum 14, strip cutter 15 is operated by cutter drive unit 34 to cut strip 1. Thereafter, a pile of the spirally wound strip 1 is transferred to the next step to be formed into a stator core.

If the number of the core slots is changed, forming roller 10 or the pair of forming rollers 10 and 11 can be changed to another which has a suitable sprocket's tooth-pitch. This can be carried out easily and timely. Outer cuts 5 can be formed in combination with inner cuts 2. The number of the fastening bolt grooves formed from outer cuts 5 can be also changed easily.

Figure 5:
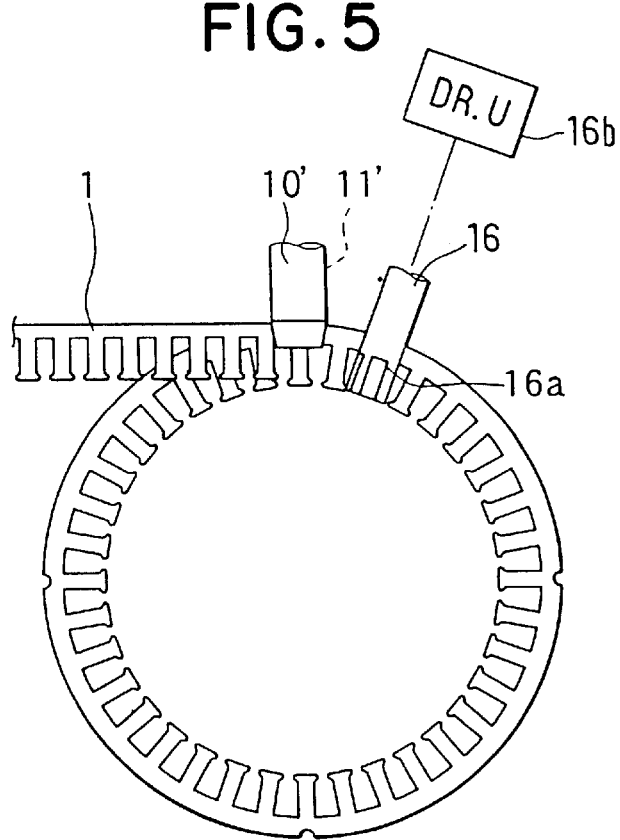
FIG. 5 is a plan view of a main portion of a core forming apparatus according to a second embodiment of the invention.

An apparatus and a method of manufacturing a stator core according to a second embodiment of the invention is described with reference to FIG. 5.

The apparatus according to the second embodiment is the same in structure as the first embodiment except moving roller 16 which has sprocket 16a at an end, a moving-roller drive-unit 16b, and a pair of forming rollers 10' and 11' that has no sprocket. Sprocket 16a engages a portion of inner cuts 2. Moving roller 16 is driven by moving-roller drive-unit 16b to engage sprocket 16a with a part of inner cuts 2 in sequence to push the side walls of teeth 3, thereby assisting the pair of forming rollers 10' and 11' to send out the spirally formed portions of strip 1.

Figure 6A:
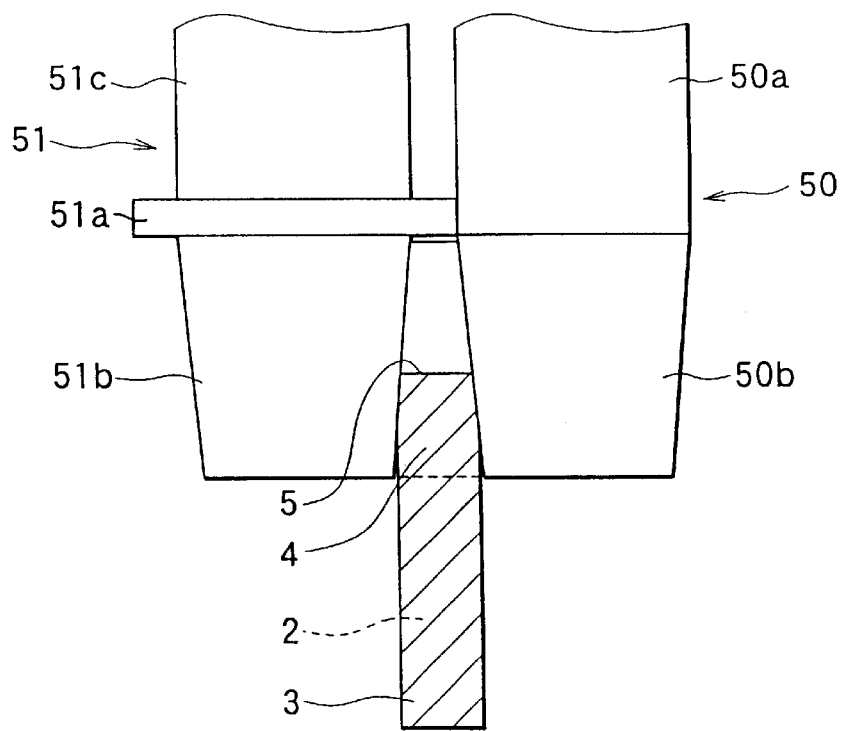
FIGS. 6A and 6B are schematic diagrams illustrating steps of pressing a magnetic strip by a pair of forming rollers according to a third embodiment of the invention.
Figure 6B:
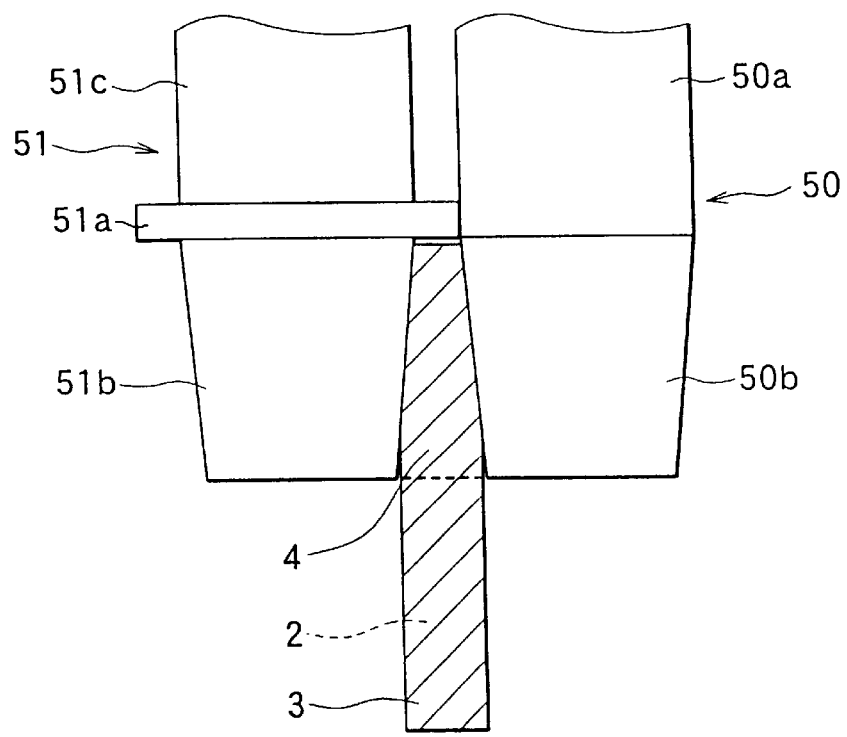

An apparatus and a method of manufacturing a stator core according to a third embodiment of the invention is described with reference to FIGS. 6A and 6B.

The apparatus according to the third embodiment is the same as the first embodiment in structure except a pair of forming rollers 50 and 51. Only one of a pair of forming rollers 50 and 51 has flange 51a at the top of inclining surface 51b or the bottom of cylindrical surface 51c. Flange 51a provides a minimum distance between forming rollers 50 and 51 to prevent core back portion 4 around each of outer cuts 5 from becoming too thin. This also restricts the axial movement of strip 2 as shown in FIG. 6B.

Figure 7:
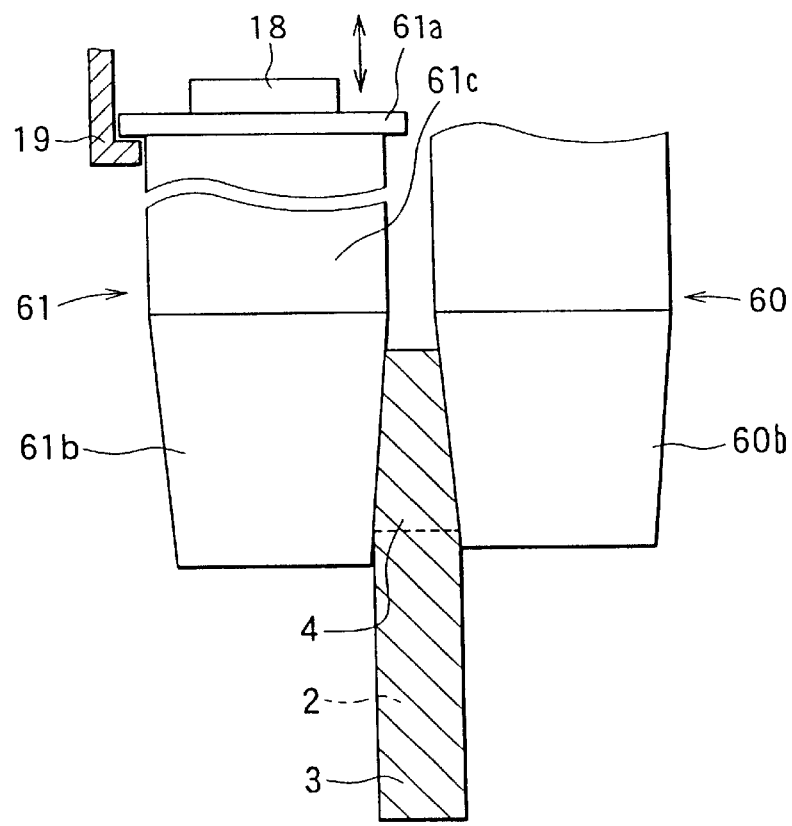
FIG. 7 is a schematic diagram illustrating a step of pressing a magnetic strip by a pair of forming rollers according to a fourth embodiment of the invention.

An apparatus and a method of manufacturing a stator core according to a fourth embodiment of the invention is described with reference to FIG. 7. The apparatus according to the fourth embodiment is the same in structure as the first embodiment except an L-shaped stopper 19 and a pair of forming rollers 60 and 61.

Forming roller 61 has flange 61a and cylindrical surface 61c. Stopper 19 engages flange 61a to restrict the axial movement of forming roller 61 to prevent the distance between tapering surfaces 60b and 61b from becoming too short. This maintains the thickness of strip constant.

As a variation, only one of a pair of forming rollers can have a tapering surface that inclines as twice as much as the tapering surface described above. The sprocket described above can have teeth to be engaged with the inner cuts at certain intervals.

Figure 9:
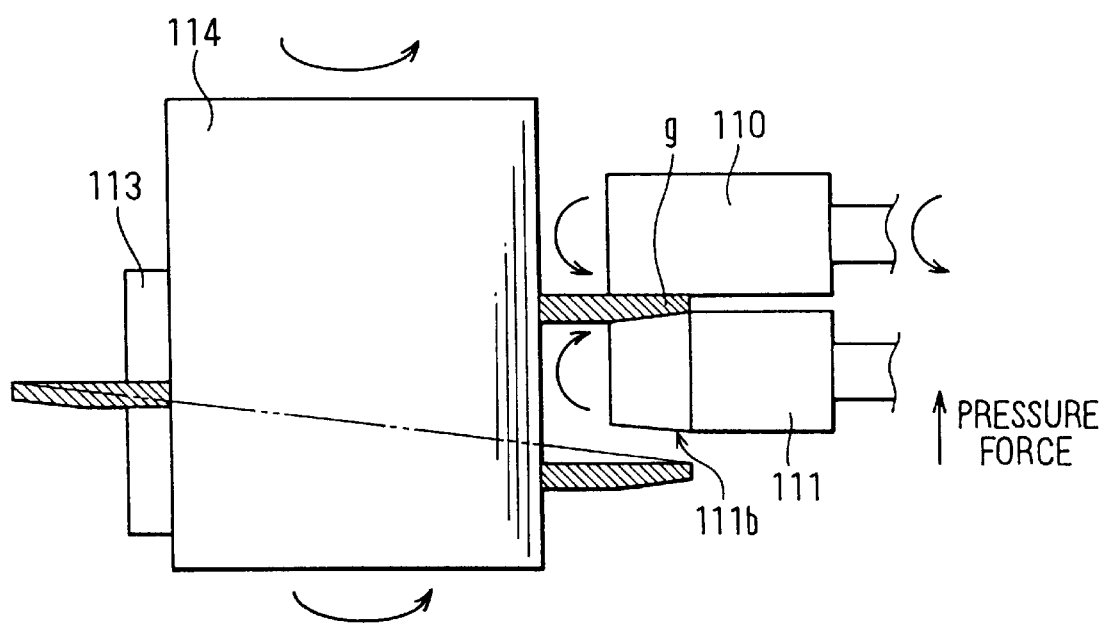
FIG. 9 is a schematic diagram illustrating a step of forming a magnetic strip into a spiral.
Figure 10:
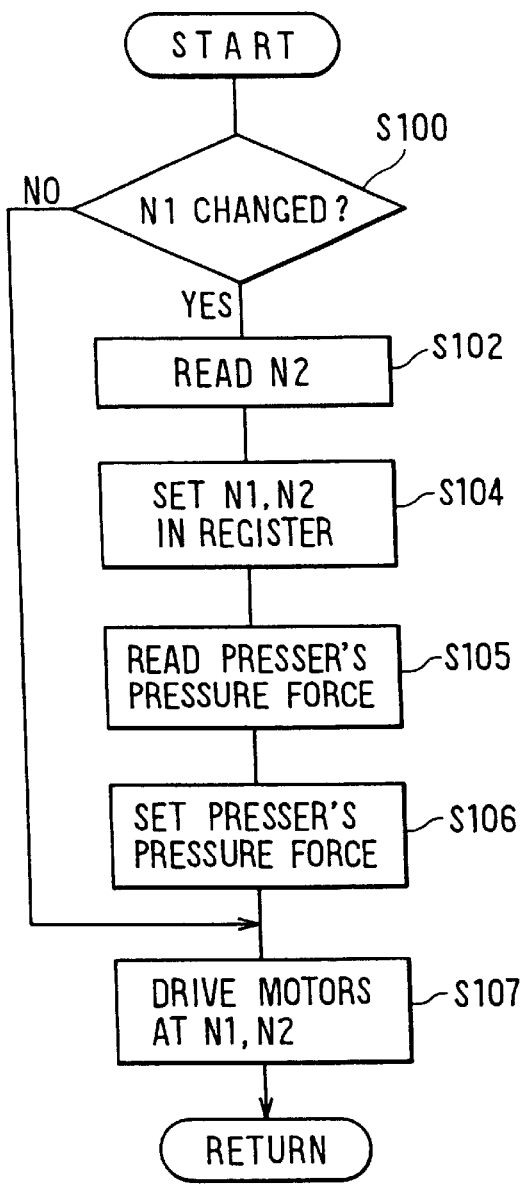
FIG. 10 is a flow diagram illustrating control of two motors and a resser.

An apparatus and a method of manufacturing a stator core according to a fifth embodiment of the invention is described with reference to FIGS. 8–10.

The apparatus includes strip loading guide 109, a pair of upper forming roller 110 and lower forming roller 111, winding drum 114, support block 117 having support frame 117a, roller slide unit 131, roller drive unit 132 having roller-drive motor 132a, roller presser unit 133, flanged carrier drum 134, slider 135, strip cutter 136, drive control unit 137, and others.

Strip loading guide 109 guides strip 1 into a wedge-shaped gap g formed between the pair of forming rollers 110 and 111.

Upper forming roller 110 is fixed to support table 117b of support frame 117a to be horizontal, and lower forming roller 111 is fixed to roller slide unit 131 to be in parallel with upper forming roller 110.

Lower forming roller 111 has a tapering surface 111b to form wedge-shaped gap g together with upper forming roller 110. Lower forming roller 111 has an axis which is rotatably supported by a pair of bearings. The pair of bearings of lower forming roller 111 is guided by roller slide unit 131 to move up and down.

Winding drum 114 is rotatably supported by support table 117b in the vertical direction under support table 117b. Winding drum 114 is rotated by drum-drive motor 114b to wind spirally formed portions of strip 1 on the outer periphery thereof. Drum-drive motor 114b is a brush-less dc motor driven by an inverter. Winding drum 114 has a pair of positioning guides 114a, which are a prescribed angle spaced apart from each other. Each positioning guide 114a projects radially outward to engage one of inner cuts 2 of each loop of the spirally formed portions of strip 1 to align each the loop as well as exerts winding torque on strip 1.

Roller slide unit 131 includes a case fixed to a side wall of support frame 117a and a guide member housed in the case for guiding lower forming roller 111 to move up or down.

Roller drive unit 132 includes roller-drive motor 132a fixed to support table 117b. Drum-drive motor 132a is a brush-less dc motor driven by an inverter.

Roller pressor unit 133 is fixed to a side wall of support frame 117a. Roller presser unit 133 comprises a linear actuator that moves lower forming roller 111 up or down via roller slide unit 131 and presses strip at a predetermined pressure. The linear actuator is provided with a vertical air cylinder, its case, a pressure air source, and a pressure control valve controlled by drive control unit 137. The vertical air cylinder is connected, at its one end, to the pair of bearings of lower forming roller 111 via the guide member of roller slide unit 131. The vertical air cylinder is moved up and down by the pressure air supplied thereto to move lower forming roller 111 up and down via the guide member, thereby controlling the size of wedge-shaped gap g.

When strip 1 is press-formed, a reaction force is applied to lower forming roller 111 to push the axis of lower forming roller 111 downward. However, the pressure air is converted to a thrusting force by the vertical air cylinder to balance the reaction force, so that the size of wedge-shaped gap g can be controlled in a stable manner.

As described above, strip 1 is apt to move toward narrower gap portion under centrifugal force applied to strip 1 when the rotation speeds of the pair of forming rollers 110 and 111 increases. However, the pressure force applied to strip 1 by the air cylinder of presser unit 133 is controlled according to, in correlation to, or in proportion to the rotation speed changes, so that strip 1 does not change axially in the gap g. Thus, strip 1 can be press-formed precisely.

Carrier drum 134 is rotatably supported by slider 135, and is disposed right under winding drum 114 coaxially therewith so that the upper surface of carrier drum 134 can not slip on the lower surface of winding drum 114. Carrier drum 134 can also move up and down on slider 135. In other words, there is a pin or wedge connection member between both the upper and lower surfaces so that carrier drum 134 can be rotated by winding drum 114. The spirally wound strip 2 drops on flanged carrier drum 134 from winding drum 114 by its own weight and heaps up. Carrier drum 134 has also a pair of positioning guides 134a, which are a prescribed angle spaced apart from each other to be engaged with one of inner cuts 2. Positioning guides 134a finally aligns inner cuts 2 in the circumferential direction to form a stator having thirty six slots.

Figure 8:
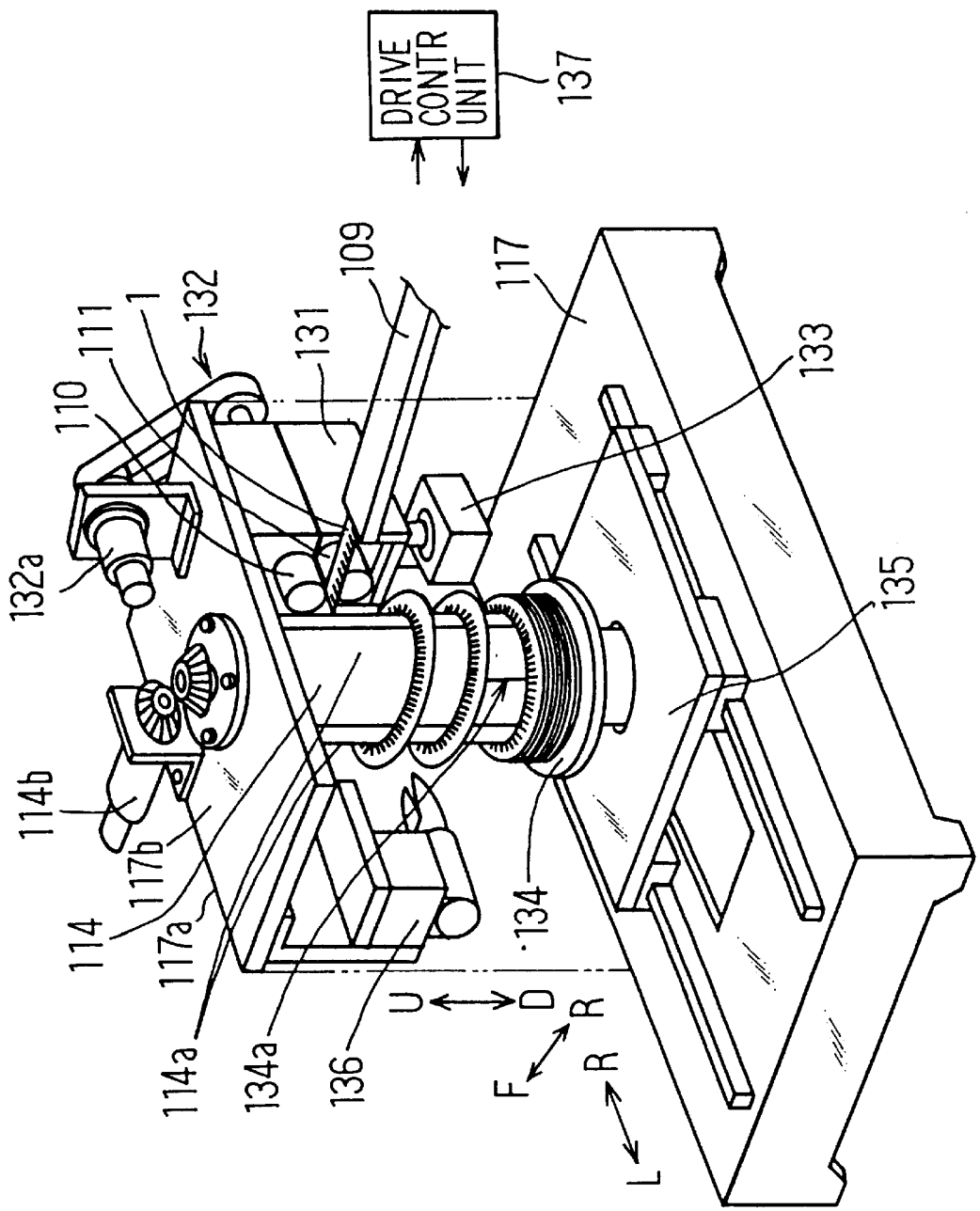
FIG. 8 is a schematic perspective view of a core-forming apparatus according to a fifth embodiment of the invention.

Slider 135 is disposed on support block 117 to be slidable from side to side thereon in the direction shown by arrow L-R in FIG. 8.

Strip cutter 136 is fixed to support frame 117a to be slidable thereon in the direction shown by arrow L-R in FIG. 8. When the spirally wound portion of strip 1 has been wound up by winding drum 114 to form a cylindrical core, strip cutter 136 approaches winding drum 114 and cuts strip 1 at a prescribed position.

Thereafter, carrier drum 134 is moved down to release the connection between winding drum 114 and carrier drum 134, so that carrier drum 134 and slider 135 are moved left to pick up the cylindrical core.

Drive control unit 137 has a map memorizing a preferable relationship of the rotation speed between drum-drive motor 114b and roller-drive motor 132a and also a map memorizing a preferable relationship between the circumferential speed of winding drum 114 or rotation speed of drum-drive motor 114b and force.

The loading speed of strip 1, which is the speed in front of and back of the pair of forming rollers 110 and 111 is equal to a circumferential speed vd of winding drum 114. That is, $vd = 2\pi \cdot rd \cdot nd$, where rd is a radius of winding drum 114, and nd is a rotation speed of the same.

If a circumferential speed of forming roller 110 is vr, $vr = 2\pi \cdot rd \cdot nd$, where rr is a radius of forming roller 110, and nr is a rotation speed of the same.

A slip ratio S of strip 1 on winding drum 114 to forming roller 110 is expressed as follows: $S = (vr - vd)/vr$. Therefore, the slip ratio S becomes larger as the circumferential speed vr of forming roller 110 becomes higher.

The slip ratio S is approximately proportional to the circumferential speed vr of forming roller 110, that is, $$S = k \cdot vr.$$

Then, the circumferential speed vd of winding drum 110 can be expressed as follows:

$$vd = (1-k) \, vr.$$

Thus, the rotation speed of winding drum 114 can be properly controlled according to the rotation speed of forming roller 110 without applying an excessive load on winding drum 114 or slackening of strip 1 between winding drum 114 and the pair of forming rollers 110 and 111. Conversely, the rotation speed of forming roller 110 can be changed according to the rotation speed of winding drum 114. The rotation speed of winding drum 114 can be also controlled according the above expression if the material of strip 1 changes and the slip ratio S changes.

Operation of drive control unit 137 is described with reference to FIG. 10.

When drive control unit 137 is turned on, whether command rotation speed N1 of roller-drive motor 132a has been changed or not is examined in step S100. If it has not been changed, motors 132a and 114b are respectively driven at the same speeds N1 and N2 as before in step S107. In this moment, the circumferential speed of winding drum 114 is set lower than the circumferential speed of upper forming roller 110. If, on the other hand, command rotation speed N1 of roller-drive motor 132a has been changed, a command rotation speed N2 of drum-driving motor 114b is read from the map in step S102. These new command rotation speeds N1 and N2 are set in a register in step S104.

Then, pressure force P of presser 133 is read from the map storing a preferable relationship between circumferential speed of winding drum 114 or the rotation speed of drum-drive motor 18 in step S105. Accordingly, presser 133 provides pressure force P in step S106, and both drive motors 114b and 132a respectively operate at speeds N1 and N2 in step S107.

As a variation, lower forming roller 111 can be driven by roller-drive motor 132a instead of upper forming roller 110, which is moved up and down by presser unit 133. Upper forming roller 110 can also have the same tapering surface as lower forming roller 111.

An apparatus and a method of manufacturing a stator core according to a sixth embodiment of the invention is described with reference to FIG. 11.

In the apparatus according to the sixth embodiment, the rotation speed of upper forming roller 110 is controlled to be constant, and the torque of winding drum 114 is controlled to be constant. Motors 132a and 114b are both brush-less dc motors respectively driven by inverters. The rotation speed of roller-drive motor 132a is controlled according to the output frequency of an inverter, and the torque of drum-drive motor 114b is controlled by a torque-control circuit.

Figure 11:
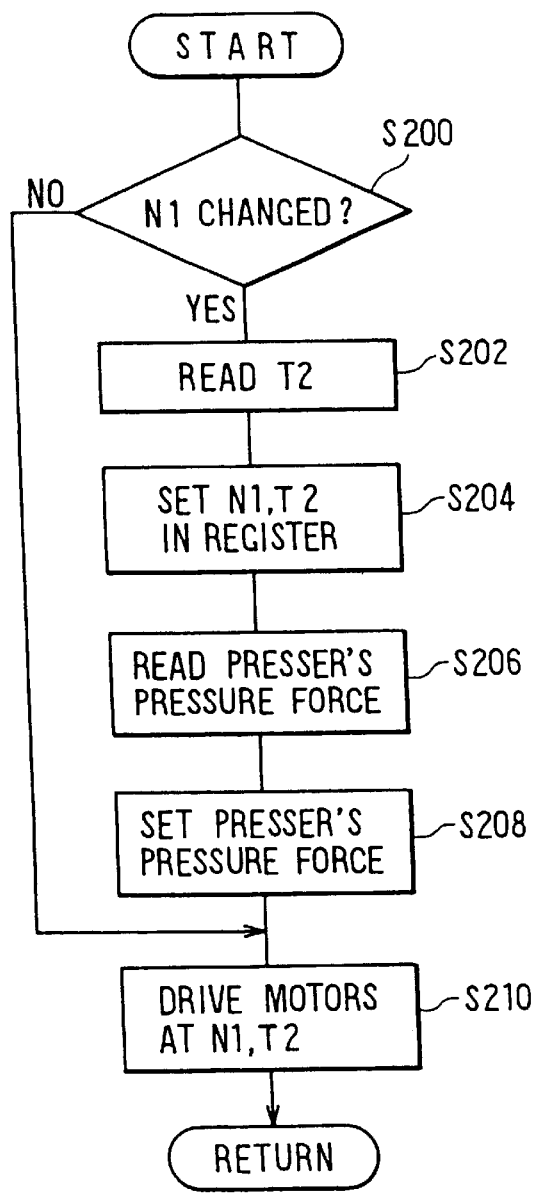
FIG. 11 is a flow diagram illustrating another control of two motors and a presser.

In FIG. 11, when drive control unit 137 is turned on, whether command rotation speed N1 of roller-drive motor 132a has been changed or not is examined in step S200. If it has not been changed, roller-drive motor 132a is driven at the same speed N1 as before, and drum-drive motor 114b is driven at the same torque T2 as before in step S210. In this moment, the circumferential speed of winding drum 114 is set lower than the circumferential speed of upper forming roller 110. If, on the other hand, command rotation speed N1 of roller-drive motor 132a has been changed, a command torque T2 of drum-driving motor 114b is read from the map in step S202. These new command rotation speed N1 and new command torque T2 are set in a register in step S204.

Then, pressure force P of presser 133 is read from the map storing a preferable relationship between circumferential speed of winding drum 114 and the pressure of presser 133 in step S206. Accordingly, presser 133 provides pressure force P in step S208, and both drive motors 114b and 132a respectively operate at speed N1 and at torque T2 in step S210.

Thus, a precise spirally wound core can be provided.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document is to be regarded in an illustrative, rather than restrictive, sense.

What is claimed is:

1. An apparatus for forming a spirally wound stator core from a strip of magnetic material having a plurality of cuts at one side thereof comprising:
    a pair of forming rollers having a wedge-shaped gap formed therebetween, one of said forming rollers being a driving roller and the other being a driven roller;
    a roller-drive motor connected to said driving roller for continuously inserting a strip of magnetic material into said wedge-shaped gap at a sending speed thereby bending said strip into a spiral with one side of said strip being radially inside;
    a winding drum disposed to receive said strip that is bent into spiral for winding the same therearound, said winding drum having a projection on an outer periphery thereof for engaging a part of said cuts;
    a drum-drive motor for rotating said winding drum at a winding speed;
    a roller presser for pressing one of said forming rollers at a controlled pressure.

2. The apparatus as claimed in claim 1, further comprising a control unit in which a relationship between speed of one of said strip and said controlled pressure is changed automatically according to said relationship.

3. The apparatus as claimed in claim 2, wherein said control unit controls rotation speed of said driving roller and torque of said winding drum, and
    wherein said controlled pressure and said torque of said winding drum are changed when said rotation speed of said driving roller is changed.

4. The apparatus as claimed in claim 1, wherein said sending speed and said winding speed are equal.

5. A method for forming a spirally wound stator core from a strip of magnetic material having a plurality of cuts at one side thereof comprising the steps of:
    continuously inserting a strip of magnetic material into a wedge-shaped gap formed between a pair of forming rollers at a sending speed;
    pressing one of said forming rollers to reduce said wedge-shaped gap at a controlled pressure, thereby bending said strip into a spiral with one side of said spiral being radially inside;
    positioning a strip-winding drum having a projection on an outer periphery thereof close to said one side with its axis being perpendicular to said pair of forming rollers; and
    engaging said projection with a part of said cuts;
    rotating said strip-winding drum at a winding speed to wind said strip that is bent into a spiral, wherein
        said controlled pressure is changed according to running speed of said strip.

6. The method as claimed in claim 5, further comprising a step of memorizing a relationship between said running speed and said controlled pressure, wherein said controlled pressure is changed automatically according to said relationship.

7. The method as claimed in claim 5, wherein said controlled pressure is changed according to a positive correlation thereof with a change in said running speed.

8. The method as claimed in claim 7, said correlation is a proportion.

9. The method as claimed in claim 5, wherein said sending speed and said winding speed are equal.

* * * * *